United States Patent
Ueno et al.

(10) Patent No.: US 8,227,695 B2
(45) Date of Patent: Jul. 24, 2012

(54) CABLE HOLDING STRUCTURE FOR WIND TURBINE GENERATOR

(75) Inventors: Yasuhiro Ueno, Tokyo (JP); Yoshiaki Tsutsumi, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 12/893,717

(22) Filed: Sep. 29, 2010

(65) Prior Publication Data

US 2011/0162865 A1    Jul. 7, 2011

Related U.S. Application Data

(63) Continuation of application No. PCT/JP2010/055961, filed on Mar. 31, 2010.

(51) Int. Cl.
*H02G 15/007* (2006.01)

(52) U.S. Cl. ...... 174/79; 174/72 A; 174/68.1; 174/99 R; 290/44; 290/55; 248/49

(58) Field of Classification Search .............. 174/135, 174/136, 68.1, 68.3, 72 A, 79, 72 R, 86, 84 R, 174/88 R, 70 C, 70 A, 95, 99 R, 40 R, 45 R; 290/55, 44, 43, 54, 91; 248/70, 74.1, 49, 248/200
See application file for complete search history.

(56) References Cited

U.S. PATENT DOCUMENTS

| 6,609,867 | B2 | 8/2003 | Wakabayashi |
| 6,713,891 | B2 | 3/2004 | Kirkegaard et al. |
| 7,982,330 | B1* | 7/2011 | Ueno et al. ............ 290/55 |
| 2009/0206610 | A1 | 8/2009 | Martin et al. |
| 2010/0006710 | A1* | 1/2010 | Lyness et al. ........... 290/55 |
| 2011/0133455 | A1* | 6/2011 | Altenschulte et al. ..... 290/44 |

FOREIGN PATENT DOCUMENTS

| JP | 2201817 A | 8/1990 |
| JP | 2004084518 A | 3/2004 |
| JP | 2006246549 A | 9/2006 |
| JP | 2008298051 A | 12/2008 |
| JP | 2009191849 A | 8/2009 |
| JP | 2010019257 A | 1/2010 |

OTHER PUBLICATIONS

ISR for PCT/JP2010/055961 dated Jun. 22, 2010.

* cited by examiner

*Primary Examiner* — Angel R Estrada
(74) *Attorney, Agent, or Firm* — Kanesaka Berner & Partners LLP

(57) ABSTRACT

A wind turbine generator includes a tower, a nacelle mounted on the tower, at least one cable suspended downward from the nacelle inside the tower, a protective tube attached to the cable to surround the cable, and a cable swing restraint support attached to the tower and provided in a position opposed to the protective tube to surround the protective tube. The protective tube is relatively movable with respect to the cable swing restraint support.

8 Claims, 9 Drawing Sheets

CABLE HOLDING STRUCTURE FOR WIND TURBINE GENERATOR

CROSS-REFERENCE TO RELATED APPLICATION

This is a continuation application of International Application No. PCT/JP2010/055961, filed on Mar. 31, 2010.

BACKGROUND OF THE INVENTION

1. Field of the Invention

The present invention relates to a wind turbine generator, more particularly, to a cable holding structure for holding a cable suspended from the nacelle of the wind turbine generator.

2. Description of the Related Art

One distinctive feature of a wind turbine generator is that main components constituting the wind turbine generator, such as a generator, a pitch control system and a yaw control system, are provided away from the ground. More specifically, a nacelle is provided on the top of a tower so that the nacelle is rotatable in the azimuth direction, and the nacelle is installed with a generator, the gear box, a pitch control system and a yaw control system.

Cables are suspended inside the tower to connect the components installed in the nacelle to facilities provided on the ground (such as in-site transmission lines and a SCADA (Supervisory Control And Data Acquisition)). The suspended cables include a power cable connected to the generator, and a control cable used for controlling the components installed in the nacelle. It is important in increasing the reliability of the wind turbine generator to appropriately design a cable holding structure which suspends and holds these cables.

One difficulty of the cable holding structure is how to deal with the rotation of the nacelle. Since a twist is given to the cable by the rotation of the nacelle, it is desirable that the cable holding structure is so designed as to structurally absorb the twist of the cable. U.S. Pat. No. 6,713,891 B2 discloses a cable holding structure that gives a downwards curve to a cable by using a fixing device provided with an upward curved plate so that the twist of the cable is absorbed by this downwards curve. Further, U.S. Pat. No. 6,713,891 B2 also discloses a cable holding structure for maintaining adjacent cables to be spaced at a constant distance.

Another difficulty of the cable holding structure is that, when the wind turbine generator is driven, the tower is largely shaken and hence the cables are largely swung. When the cables are largely swung, it may cause a contact between a structural member (e.g., a ladder) in the tower and the cables, resulting in damages of the cables. U.S. Patent Publication No. 2009/0206610 (A1) discloses a wind turbine generator provided with a first cable guard for covering a ladder and a second cable guard of a tubular shape for suppressing a movement of a cable in a tower.

However, there is room for improvement in these known cable holding structures in view of avoiding the cables being damaged.

SUMMARY

Therefore, an objective of the present invention is to provide a cable holding structure which effectively avoids a cable being damaged.

In one aspect of the present invention, a wind turbine generator includes a tower, a nacelle mounted on the tower, at least one cable suspended downward from the nacelle inside the tower, a protective tube attached to the cable to surround the cable, and a cable swing restraint support attached to the tower and provided in a position opposed to the protective tube to surround the protective tube. The protective tube is relatively movable with respect to the cable swing restraint support.

In a case where said at least one cable includes first and second cables, the wind turbine generator is preferably further provided with an inter-cable spacing retention mechanism including a spacer for retaining a spacing between the first and second cables. Preferably, the inter-cable spacing retention mechanism is relatively movable with respect to the tower.

Preferably, the spacing between the first cable and the second cable retained by the protective tube is substantially the same as that between the first cable and the second cable retained by the spacer tube.

In one embodiment, the wind turbine generator further includes a cable guide coupled to a lower frame of the nacelle and a cable securing cleat attached to the cable guide to support the cable. The cable securing cleat includes an elastic spacer attached to the cable to surround the cable and first and second members for holding the elastic spacer clamped therebetween, wherein the first and second members are attached to the cable guide.

In one embodiment, the cable securing cleat further includes a coil spring, a bolt and a nut screwed with the bolt. The first member includes a tubular sleeve. The sleeve has a first opening through the bottom portion thereof while the coil spring is inserted to the sleeve. Meanwhile, the second member has a second opening. The bolt and nut are fastened in a state in which the bolt is put through the coil spring and the first and second openings, whereby the first and second members are coupled.

In the case where the wind turbine generator further includes a cable drum for providing a downwards curve for the cable, the protective tube and the cable swing restraint support are preferably positioned between the downwards curve and the nacelle.

The present invention provides a cable holding structure which effectively avoids a cable being damaged.

DESCRIPTION OF PREFERRED EMBODIMENTS

Figure 1:
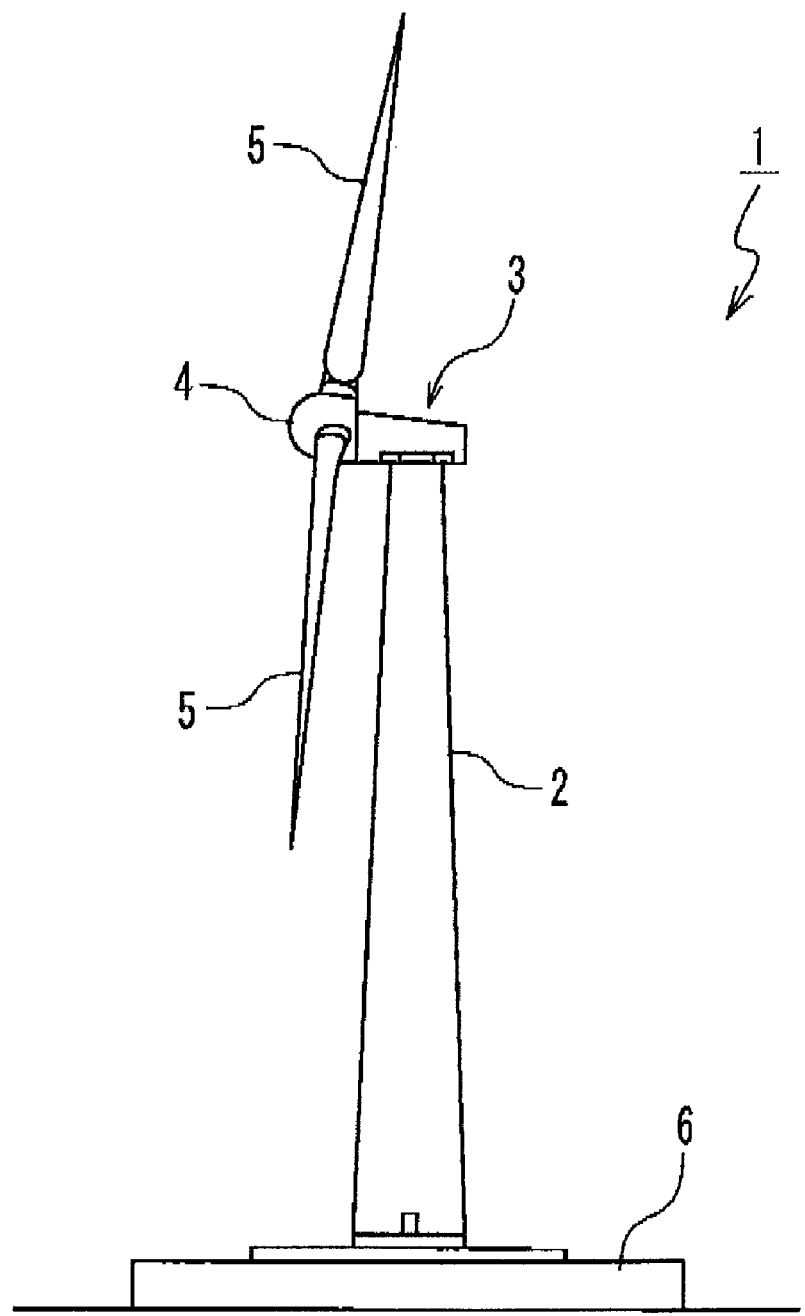
FIG. 1 is a side view showing the configuration of a wind turbine generator in one embodiment of the present invention.

FIG. 1 is a side view showing the configuration of a wind turbine generator 1 in one embodiment of the present invention. The wind turbine generator 1 includes a tower 2 stood on a foundation 6, a nacelle 3 provided on the top end of the tower 2, a rotor head 4 rotatably attached to the nacelle 3, and wind turbine blades 5 attached to the rotor head 4. The rotor head 4 and the wind turbine blades 5 constitute a wind turbine rotor. When the wind turbine rotor is rotated by wind power, the wind turbine generator 1 generates electric power and supplies the power to the utility grid connected with the wind turbine generator 1.

Figure 2:
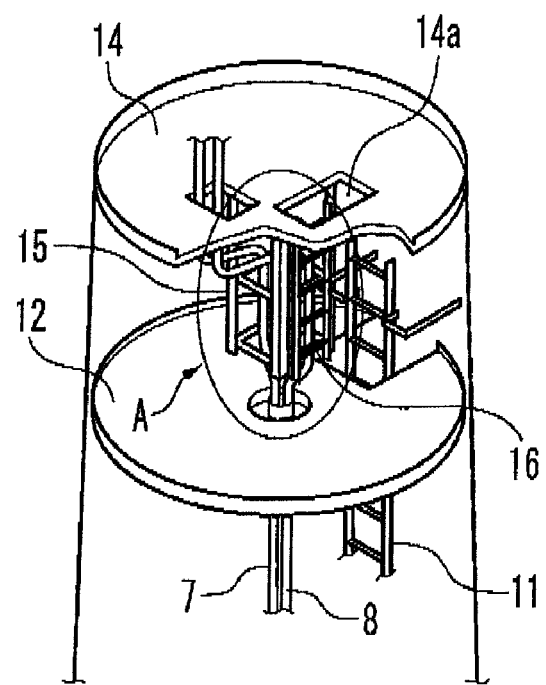
FIG. 2 is a perspective view showing the inner structure of a tower in one embodiment.
Figure 2:
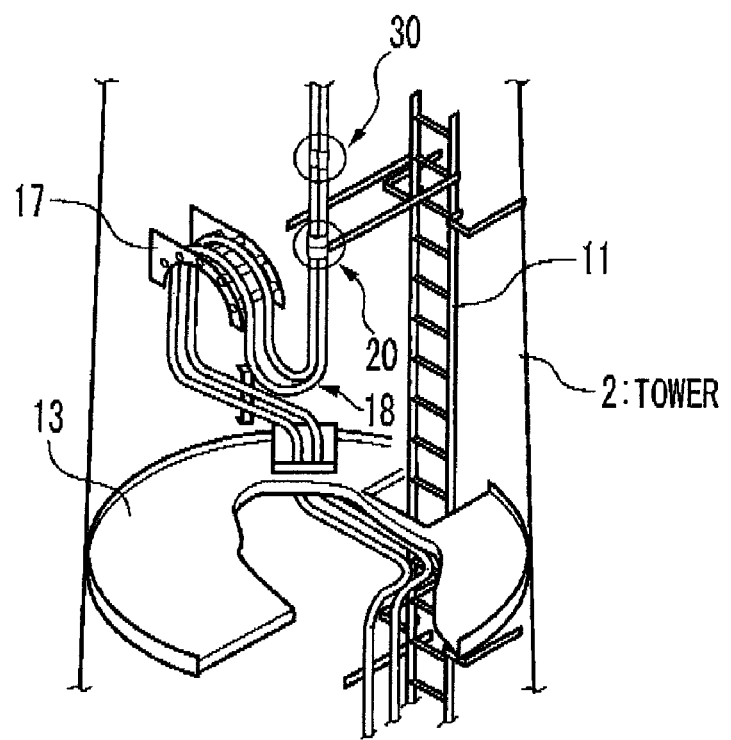

FIG. 2 is a perspective view showing the inner structure of the tower 2. In this embodiment, two bundles of cables 7 and 8 are suspended from the nacelle 3. The cables 7 are used for supplying control signals to equipment provided in the nacelle 3 (e.g., a nacelle control panel, a generator and the like) and sending control signals from the equipment to an external control device (e.g., SCADA (Supervisory Control And Data Acquisition)). Meanwhile, the cables 8 are power cables for connecting the generator provided in the nacelle 3 and the utility grid. Herein, the number of the bundles of the cables is not limited to two. In the following, a detailed description is given of the structure provided in the tower 2 and the structure for holding the cables 7 and 8.

A ladder 11 is vertically attached to the inner face of the tower 2, and an upper landing 12 and a lower landing 13 are further provided. The upper landing 12 and the lower landing 13 have openings, respectively, and the ladder 11 passes through the openings. A worker can reach the upper landing 12 by climbing the ladder 11.

A lower frame 14 of the nacelle 3 has an opening 14a used for a worker to get in and out therethrough and, in the proximity thereof, a cable guide 15 is attached to the undersurface of the lower frame 14. An access ladder 16 is attached to the cable guide 15. A worker can enter the inside of the nacelle 3 by climbing the access ladder 16 from the upper landing 12. The cable guide 15 is attached so that the rotation axis of the nacelle 3 is vertically extended to pass through the inside the cable guide 15. The cables 7 and 8 are routed through the cable guide 15 and attached to the cable guide 15 and suspended therefrom. The structures for attaching the cables 7 and 8 to the cable guide 15 are described later. The cables 7 and 8 are extended downward from the cable guide 15 to pass through the opening provided through the upper landing 12.

A cable drum 17 is attached to a position between the upper landing 12 and the lower landing 13 on the inner face of the tower 2. The cables 7 and 8 suspended from the cable guide 15 are routed along the upper surface of the cable drum 17 and further guided downward the cable drum 17. The cable drum 17 has a function of providing a downward curve 18 for the cables 7 and 8 suspended from the cable guide 15. The existence of the downward curve 18 is useful for accepting a twist of the cables 7 and 8 when the nacelle 3 is rotated. Even when the cables 7 and 8 are twisted by the rotation of the nacelle 3, the twist is absorbed by the downward curve 18 so that the rotation of the nacelle 3 does not cause displacements of the cables 7 and 8 below the cable drum 17. This effectively facilitates the connection of the cables 7 and 8 to the facilities built on the ground.

In order to restrict the swing of the cables 7 and 8, a cable swing restraint structure 20 is provided between the cable guide 15 and the cable drum 17. The cable swing restraint structure 20 is attached to the ladder 11. In addition, an inter-cable spacing retention structure 30 is attached to the cables 7 and 8 to appropriately retain the spacing between the cables 7 and 8. In this embodiment, the cable swing restraint structure 20 and the inter-cable spacing retention structure 30 mainly provide a function of preventing the cables 7 and 8 from being damaged. It should be noted that, although one cable swing restraint structure 20 and one inter-cable spacing retention structure 30 are shown in FIG. 2, two or more cable swing restraint structures 20 and two or more inter-cable spacing retention structures 30 may be attached to the cables 7 and 8. In the following, a description is given of the cable swing restraint structure 20 and the inter-cable spacing retention structure 30.

Figure 3A:
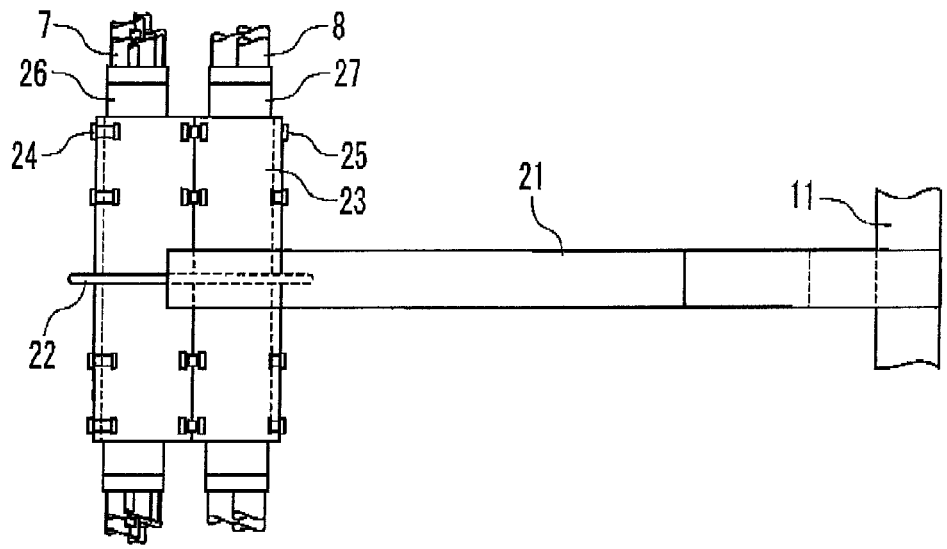
FIG. 3A is a side view showing the structure of a cable swing restraint structure in one embodiment.
Figure 3B:
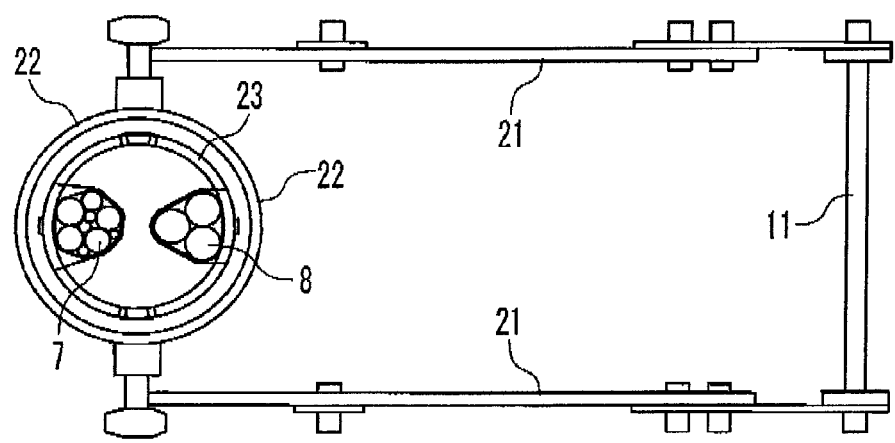
FIG. 3B is a top plan view showing the structure of the cable swing restraint structure in FIG. 3A.

FIG. 3A is a side view showing the structure of the cable swing restraint structure 20, and FIG. 3B is a top plan view thereof. The cable swing restraint structure 20 includes a pair of arms 21 fixed to the ladder 11 and a cable swing restraint support 22. The cable swing restraint support 22 has a ring shape, and the cables 7 and 8 are suspended to pass through the cable swing restraint support 22. The arms 21 and the cable swing restraint support 22 are made of metal material, for example, steel. A cylindrical protective tube 23 is attached to the cables 7 and 8 at a position opposed to the cable swing restraint support 22. The protective tube 23 is made of resin (typically, vinyl chloride), and the cables 7 and 8 are bound and fixed to the inner face of the protective tube 23 by binding bands 24 and 25.

Figure 4A:
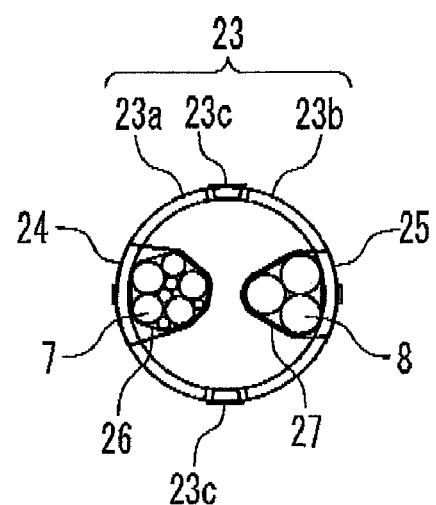
FIG. 4A is a top plan view showing the structure of securing a cable to a protective tube in one embodiment.
Figure 4B:
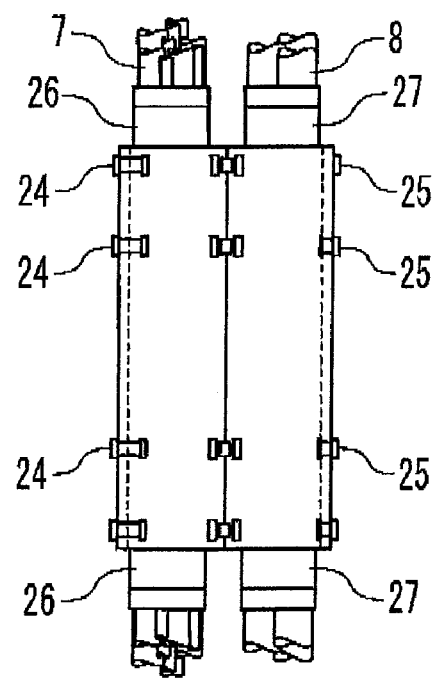
FIG. 4B is a side view showing a structure for securing a cable to a protective tube.

FIG. 4A is a top plan view showing the structure for securing the cables 7 and 8 to the protective tube 23, and FIG. 4B is a side view thereof. Referring to FIG. 4A, the protective tube 23 includes two semi-cylindrical members 23a and 23b. Each of the members 23a and 23b is provided with openings so that the members 23a and 23b are coupled by binding bands 23c. The structure in which the protective tube 23 is dividable into two members allows easily attaching the protective tube 23 to the cables 7 and 8. A band made of elastic material, specifically a rubber band 26 is wrapped around the cable bundle 7 so that the cables 7 are bundled together by the rubber band 26. Further, openings are formed through the protective tube 23 in the vicinity of the position where the cable bundle 7 is secured, so that binding bands 24 are routed through the openings from the outside of the protective tube 23. The cables 7 are bound to the inner surface of the protective tube 23 on the face of the rubber band 26 by the binding bands 24. Similarly, a rubber band 27 is wrapped around the cable bundle 8 so that the cables 8 are bundled together by the rubber band 27. Further, openings are formed through the protective tube 23 in the vicinity of the position where the cables 8 are secured, so that the binding bands 25 are routed through the openings from the outside of the protective tube 23. The cables 8 are bound to the inner surface of the protective tube 23 on the rubber band 27 by the binding band 25.

The cable swing restraint structure 20 restrains movements of the cables 7 and 8 by the cable swing restraint support 22 so as to reduce the swings of the cables 7 and 8. This is effective to reduce the damages of the cables 7 and 8 in the positions where the cables 7 and 8 are attached to the cable guide 15. It should be noted, however, that the cable swing restraint structure 20 accepts the swings of the cables 7 and 8 to some degrees and is not a structure of securely holding the cables. This aims to accept the twists of the cables 7 and 8 when the nacelle 3 is rotated. When the nacelle 3 is rotated, the cables 7 and 8 are twisted. Here, the twists of the cables 7 and 8 are accepted, since the cables 7 and 8 are mechanically separated from the cable swing restraint support 22. As described above, the twists of the cables 7 and 8 are absorbed by the downward curve 18 formed by the cable drum 17.

In this configuration, the protective tube 23 provides a function of preventing damages of the cables 7 and 8 when the cables 7 and 8 are swung. In this embodiment, when the cables 7 and 8 are swung, the protective tube 23 comes into contact with the cable swing restraint support 22 so that the cables 7 and 8 do not come into contact with the cable swing restraint support 22. Thus, the cables 7 and 8 are effectively protected.

Figure 5A:
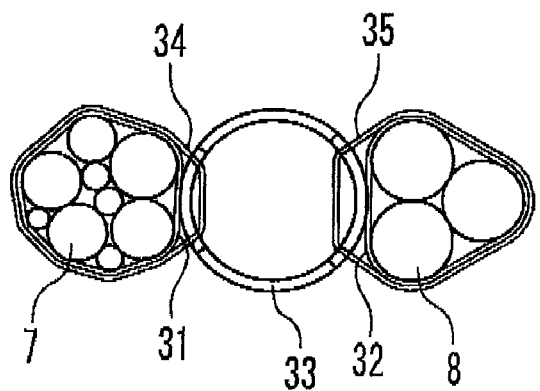
FIG. 5A is a sectional view showing the configuration of an inter-cable spacing retention structure in one embodiment.
Figure 5B:
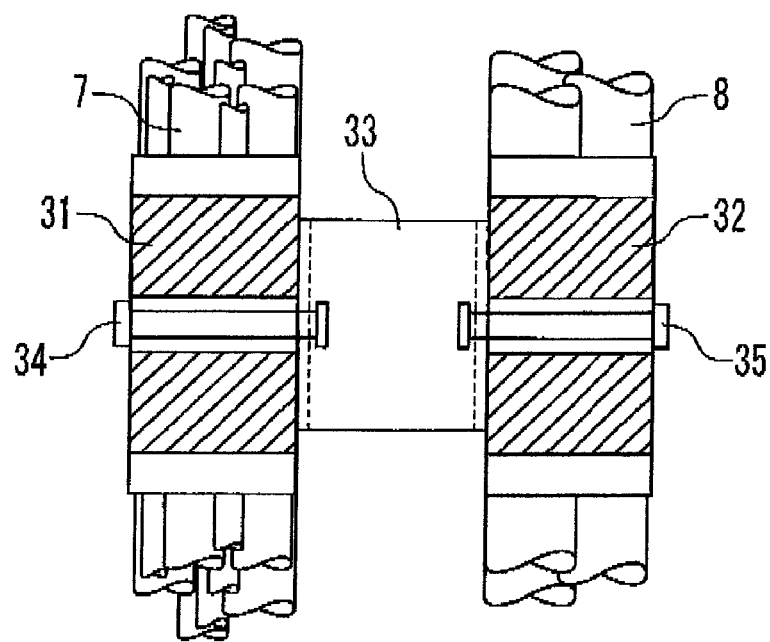
FIG. 5B is a side view showing the configuration of the inter-cable spacing retention structure in FIG. 5A.

Meanwhile, FIG. 5A is a sectional view showing the structure of the inter-cable spacing retention structure 30, and FIG. 5B is a side view thereof. As shown in FIG. 5A, a band made of elastic material, specifically a rubber band 31 is wrapped around the cables 7 so that the cables 7 are bundled by the rubber band 31. Similarly, a rubber band 32 is wrapped around the cables 8 so that the cables 8 are bundled by the rubber band 32.

The inter-cable spacing retention structure 30 includes a spacer tube 33. The spacer tube 33 provides a function for retaining a constant spacing between the cables 7 and 8. The spacer tube 33 is provided with openings formed in the vicinity of a portion to which the cables 7 are abutted so that the cables 7 are bound to the outer face of the spacer tube 33 by a binding band 34 which is routed through the openings. Similarly, the spacer tube 33 is also provided with openings formed in the vicinity of a portion to which the cables 8 are abutted so that the cables 8 are bound to the outer face of the spacer tube 33 by a binding band 35 which is routed through the openings.

The cable swing restraint structure 20 and the inter-cable spacing retention structure 30 mechanically couple the cables 7 and 8 with a constant spacing kept between the cables 7 and 8, preventing the cables 7 and 8 from coming into contact with each other. The use of the inter-cable spacing retention structure 30 makes it unlikely that the cables 7 and 8 come into contact with each other when the cables 7 and 8 are twisted by the rotation of the nacelle 3. This effectively prevents damages of the cables 7 and 8 when the nacelle 3 is rotated. In order to effect such a function, it is preferable that the spacing between the cables 7 and 8 retained by the protective tube 23 of the cable swing restraint structure 20 is substantially the same as the spacing between the cables 7 and 8 retained by the spacer tube 33 of the inter-cable retaining structure 30.

Various structures may be used for attaching the cables 7 and 8 to the cable guide 15. It is important not to be applied an excessive force to the coatings of the cables 7 and 8 while the cables 7 and 8 are securely fixed. In the following, a description is given of preferred structures for attaching the cables 7 and 8 to the cable guide 15.

Figure 6A:
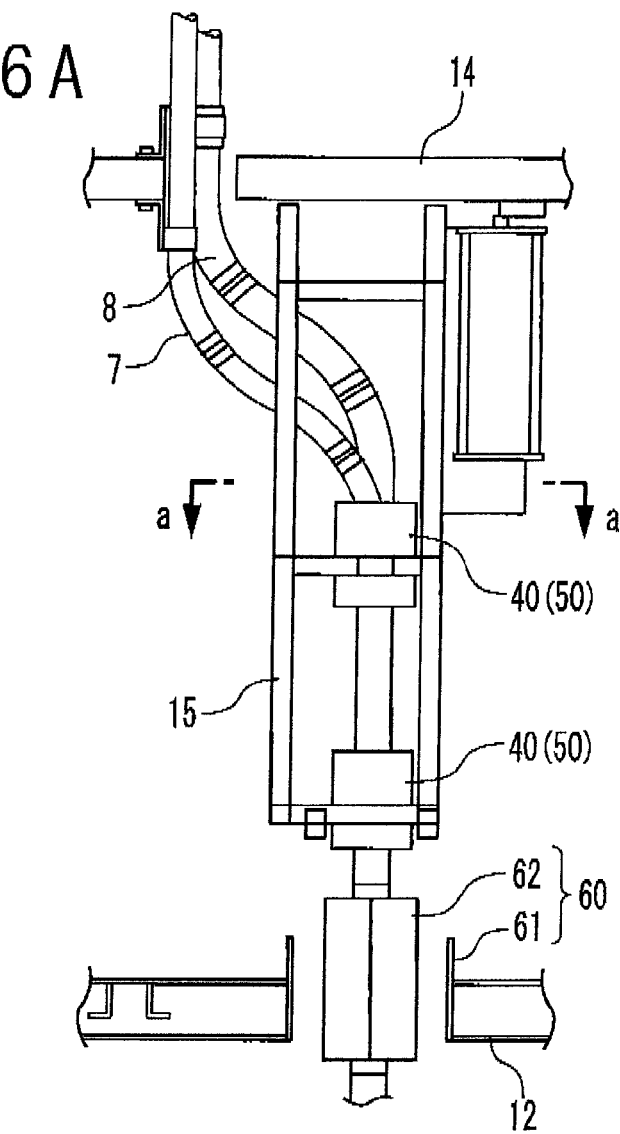
FIG. 6A is a side view showing the structure of the part A in FIG. 2.
Figure 6B:
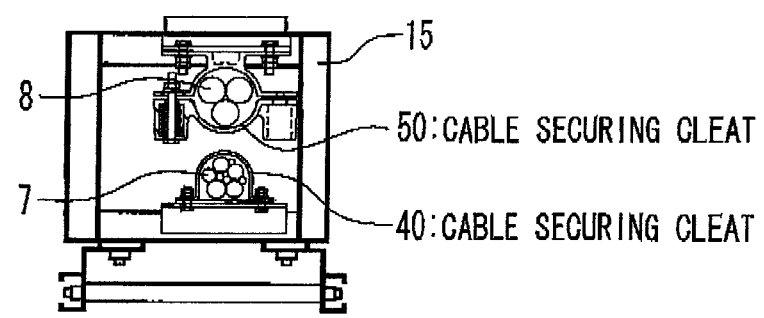
FIG. 6B is a diagram when seeing downward from the plane a-a in FIG. 6A.

FIG. 6A is a side view of the structure of the part A shown in FIG. 2, particularly the structure of attaching the cables 7 and 8 to the cable guide 15, and FIG. 62 is a diagram viewed downward from the plane a-a. As shown in FIG. 66, the cables 7 and 8 are secured to the cable guide 15 by cable securing cleats 40 and 50, respectively, in this embodiment.

Figure 7A:
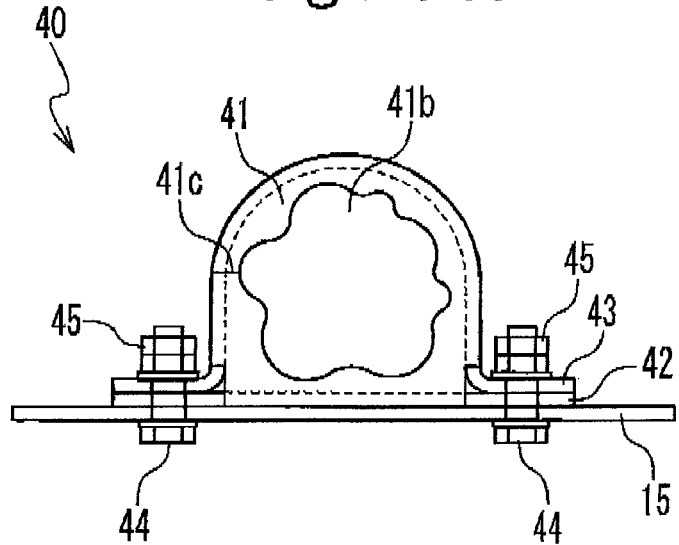
FIG. 7A is a side view showing a structure of a cable securing cleat in one embodiment.
Figure 7B:
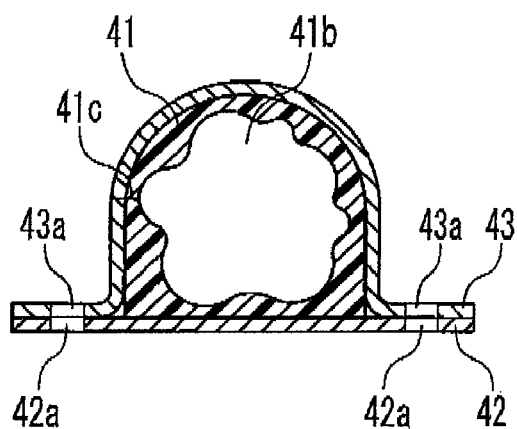
FIG. 7B is a sectional view showing the structure of the cable securing cleat in FIG. 7A.
Figure 7C:
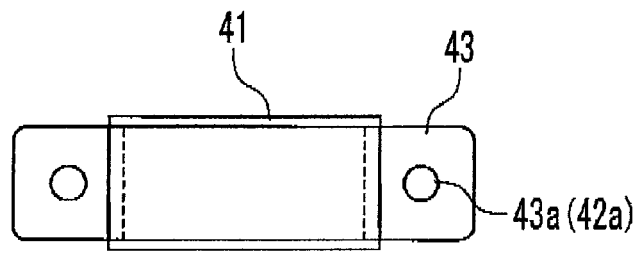
FIG. 7C is a top plan view showing the structure of the cable securing cleat in FIG. 7A.
Figure 7D:
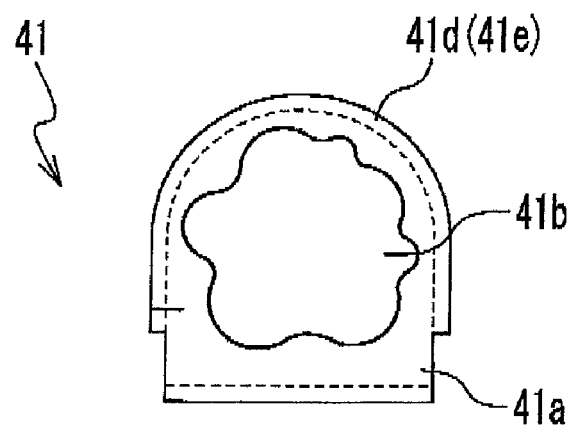
FIG. 7D is a side view showing a structure of an elastic spacer of the cable securing cleat in FIG. 7A.
Figure 7E:
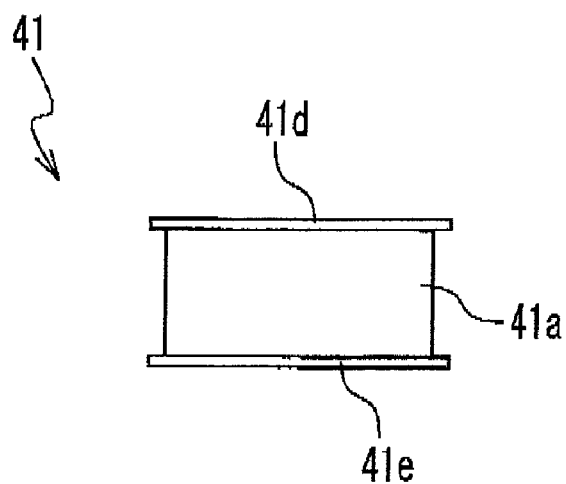
FIG. 7E is a top plan view showing the structure of the elastic spacer of the cable securing cleat in FIG. 7A.

FIGS. 7A to 7E are diagrams showing the structure of the cable securing cleat 40 for securing the cable bundle 7. With reference to FIG. 7A, the cable securing cleat 40 includes an elastic spacer 41, a subsidiary plate 42, a U-shaped cleat main body 43, bolts 44 and nuts 45. The elastic spacer 41 is made of elastic material such as rubber. The elastic spacer 41 is provided with an opening 41b having a shape corresponding to the bundle of the cables 7. In addition, the elastic spacer 41 is provided with a slit 41c so that the bundle of the cables 7 can be put through the opening 41b by opening the slit 41c. As shown in FIGS. 7D and 7E, the elastic spacer 41 includes a spacer main body 41a and side plate portions 41d and 41e provided on both sides thereof. The side plate portions 41d and 41e are outwardly protruded from the spacer main body 41a and the cleat body 43 is abutted to the spacer main body 41a between the side plate portions 41d and 41e. These side plate portions 41d and 41e have a function of preventing the elastic spacer 41 from displacing in the axial direction of the cables 7.

As shown in FIGS. 7B and 7C, the subsidiary plate 42 and the cleat body 43 are provided with openings through which the bolts 44 are put. The elastic spacer 41 is clamped between the cleat body 43 and the subsidiary plate 42 in a state that the cables 7 are put through the opening 41b (see FIG. 7B), and further the cleat body 43, the subsidiary plate 42 and the cable guide 15 are clamped by the bolts 44 and nuts 45, whereby the cable securing cleat 40 is attached to the cable guide 15.

It is preferable to use so-called "a hard lock nut" as the nuts 45. The hard lock nut is a nut assembly including an upper nut having a recess and a lower nut having a protrusion engaged with the recess. The hard lock nut is disclosed, for example, in U.S. Pat. No. 6,609,867.

The cable securing cleat 40 shown in FIGS. 7A to 7E supports the cables 7 by surrounding the cables 7 with the elastic spacer 41, and further clamping the elastic spacer 41 between the cleat body 43 and the subsidiary plate 42. The cable securing cleat 40 having such a structure can support the cables 7 with an optimum strength, while restraining the coatings of the cables 7 from being damaged.

Figure 8A:
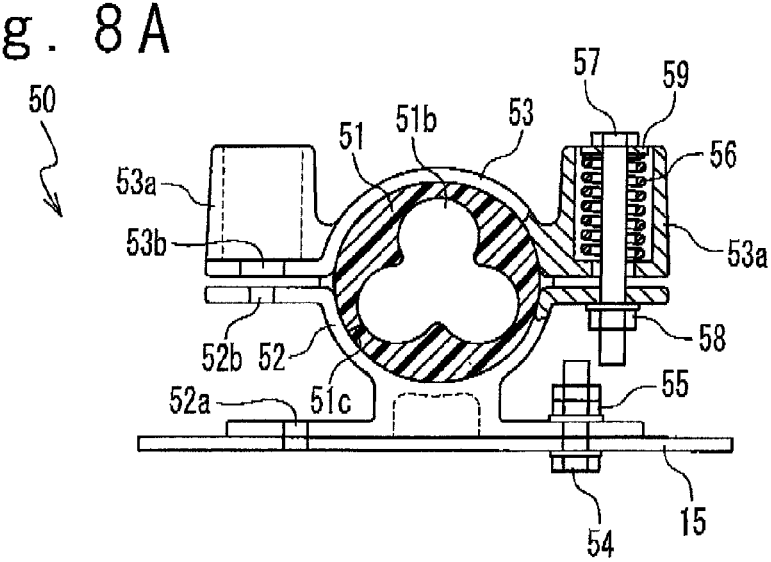
FIG. 8A is a side view showing a structure of a cable securing cleat in one embodiment.
Figure 8B:
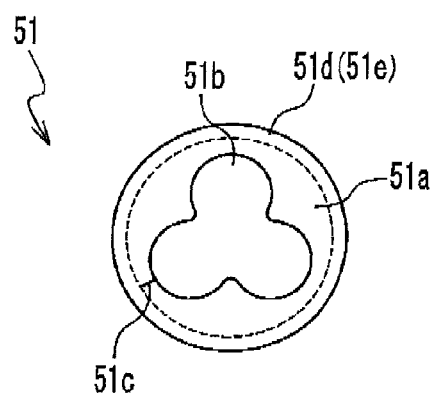
FIG. 8B is a top plan view of a spacer main body in FIG. 8A.
Figure 8C:
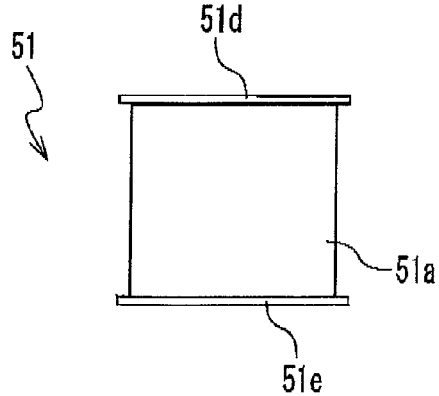
FIG. 8C is a side view of the spacer main body in FIG. 8A.

On the other hand, FIGS. 8A to 8C are diagrams showing the structure of the cable securing cleat 50 for supporting the cables 8. The cable securing cleat 50 has a structure different from that of the cable securing cleat 40 mentioned above as to be described below. With reference to FIG. 8A, the cable securing cleat 50 includes an elastic spacer 51, a main body lower part 52, a main body upper part 53, bolts 54, nuts 55, coil springs 56, bolts 57, nuts 58 and washers 59. Although only one bolt 54, one nut 55, one coil spring 56, one bolt 57, one nut 58 and one washer 59 are shown in FIG. 8A, it should be understood that that these parts are provided in pairs provided across the elastic spacer 51.

The elastic spacer 51 is provided with an opening 51b having a shape corresponding to the bundle of the cables 8. In addition, the elastic spacer 51 is provided with a slit 51c so that the bundle of the cables 8 can be put through the opening 51b by opening the slit 51c. As shown in FIGS. 8B and 8C, the elastic spacer 51 includes a spacer main body 51a and side plate portions 51d and 51e provided on both sides thereof. The side plate portions 51d and 51e are outwardly protruded from the spacer main body 51a, and the main body lower part 52 and the main body upper part 53 are abutted to the spacer main body 51a between the side plate portions 51d and 51e. These side plate portions 51d and 51e provide a function of preventing the elastic spacer 51 from displacing in the axial direction of the cables 8.

Referring back to FIG. 8A, the main body lower part 52 and the main body upper part 53 are clamped by the coil springs 56, the bolts 57 and the nuts 58. More specifically, the main body upper part 53 is provided with cylindrical sleeves 53a, and openings 53b are formed through the bottom portions of the respective sleeve 53a. In addition, the main body lower part 52 is provided with openings 52b opposing to the openings 53b. The coil springs 56 are inserted into the sleeves 53a of the main body upper part 53, and the bolts 57 are so inserted through the coil springs 56 and the openings 53b and 52b. The washers 59 are provided between the bolts 57 and the coil springs 56. The cables 8 are fixed to the cable securing cleat 50 by tightening the bolts 57 and the nuts 58 in a state in which the cables 8 are surrounded with the elastic spacer 51. Here, the force of clamping the elastic spacer 51 between the main body lower part 52 and the main body upper part 53 is adjusted by the spring constant of the coil springs 56 and the tightening torque of the bolts 57.

Moreover, the main body lower part 52 is provided with openings 52a through which the bolts 54 are inserted. The cable securing cleat 50 is attached to the cable guide 15 by clamping the main body lower part 52 and the cable guide 15 with the bolts 54 and the nuts 55. A hard lock nut mentioned above may be preferably used as the nuts 55.

The cable securing cleat 50 shown in FIGS. 8A to 8C supports the cable bundle 8 by surrounding the cables 8 with the elastic spacer 51, and further clamping the elastic spacer 51 between the main body lower part 52 and the main body upper part 53. Here, the force of clamping the elastic spacer 51 between the main body lower part 52 and the main body upper part 53 is adjusted by the spring constant of the coil springs 56 and the clamping torque of the bolts 57. The cable securing cleat 50 having such a structure can support the cables 8 with an optimum strength while suppressing the damage of the coatings of the cables 8, even when the bundle of the cables 8 is thick.

Referring back to FIG. 6A, a cable protection structure 60 is provided in a position opposing to the upper landing 12 of the cables 7 and 8. The cable protection structure 60 provides a function of preventing a contact between the upper landing 12 and the cables 7 and 8 to thereby protect the cables. Specifically, a cylindrical cable swing restraint tube 61 is fixed to the circumference of the opening formed through the upper landing 12 for routing the cables 7 and 8 therethrough. The cables 7 and 8 are routed through the cable swing restraint tube 61 so that the cable swing restraint tube 61 also provides a function of restraining the movements of the cables 7 and 8 and thereby reducing the swings of the cables 7 and 8. Meanwhile, a protective tube 62 is attached to the cables 7 and 8 at a position opposing to the cable swing restraint tube 61. The structure of attaching the cables 7 and 8 to the protective tube 62 is the same as the structure shown in FIGS. 4A and 4B. When the cables 7 and 8 are swung, the protective tube 62 comes into contact with the cable swing restraint tube 61, avoiding the cables 7 and 8 being in direct contact with the cable swing restraint tube 61. Thus, the swings of the cables 7 and 8 are restrained while the cables 7 and 8 are prevented from being damaged.

Although the embodiments of the present invention are described above in specific, the present invention should not be interpreted as being limited to the embodiments and it would be apparent for those skilled in the art that various changes or modifications may be made.

What is claimed is:

1. A wind turbine generator, comprising:
   a tower;
   a nacelle mounted on said tower;
   at least one cable suspended downward from said nacelle inside said tower;
   a protective tube attached to said cable; and
   a cable swing restraint support attached to said tower and provided in a position opposed to said protective tube to surround said protective tube,
   wherein said protective tube is relatively movable with respect to said cable swing restraint support, and
   said protective tube partially surrounds said cable.

2. The wind turbine generator according to claim 1, further comprising an inter-cable spacing retention mechanism, wherein
   said at least one cable includes first and second cables, and
   the inter-cable spacing retention mechanism includes a spacer tube which retains a first spacing between said first and second cables.

3. The wind turbine generator according to claim 2, wherein said inter-cable spacing retention mechanism is relatively movable with respect to said tower.

4. The wind turbine generator according to claim 2, wherein
   a second spacing is defined between said first and second cables as retained by said protective tube, and
   the second spacing between said first and second cables as retained by said protective tube is substantially same as first spacing between said first and second cables as retained by said spacer tube.

5. The wind turbine generator according to claim 1, further comprising:
   a cable guide coupled to a lower frame of said nacelle; and
   a cable securing cleat attached to said cable guide to support said cable,
   wherein said cable securing cleat includes:
   an elastic spacer attached to said cable to surround said cable;
   first and second members for holding said elastic spacer clamped therebetween,
   wherein said first and second members are attached to said cable guide.

6. The wind turbine generator according to claim 5, wherein said cable securing cleat further includes:
   a coil spring;
   a bolt; and
   a nut screwed with said bait,
   wherein said first member includes a tubular sleeve,
   wherein said coil spring is inserted into said sleeve and said sleeve has a first opening through a bottom portion thereof,
   wherein said second member has a second opening, and
   wherein said first and second members are coupled by tightening said bolt and nut in a state in which said bolt is put through said coil spring and said first and second openings.

7. The wind turbine generator according to claim 1, further comprising: a cable drum for providing a downwards curve for said cable,
   wherein said protective tube and said cable swing restraint support are positioned between the downwards curve and said nacelle.

8. A wind turbine generator, comprising:
   a tower;
   a nacelle mounted on said tower;
   at least one cable suspended downward from said nacelle inside said tower;
   a protective tube attached to said cable so as to surround said cable;
   a cable swing restraint support attached to said tower and provided in a position opposed to said protective tube to surround said protective tube, a cable guide coupled to a lower frame of said nacelle; and
a cable securing cleat attached to said cable guide to support said cable, wherein
said cable securing cleat includes:
  an elastic spacer attached to said cable to surround said cable; and
  first and second members for holding said elastic spacer clamped therebetween,
said first and second members are attached to said cable guide wherein
said protective tube is relatively movable with respect to said cable swing restraint support, and
said cable securing cleat further includes:
  a coil spring;
  a bolt; and
  a nut screwed with said bolt,
wherein
said first member includes a tubular sleeve,
said coil spring is inserted into said sleeve and said sleeve has a first opening through a bottom portion thereof,
said second member has a second opening, and
said first and second members are coupled by tightening said bolt and nut in a state in which said bolt is put through said coil spring and said first and second openings.

* * * * *